(12) United States Patent
Bissen et al.

(10) Patent No.: US 11,633,062 B2
(45) Date of Patent: Apr. 25, 2023

(54) METHOD AND APPARATUS FOR PREPARING WATER FOR COFFEE BREWING

(71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A, St. Peter Port (GG)

( * ) Notice: Subject to any disclaimer, the term of this patent is extended or adjusted under 35 U.S.C. 154(b) by 502 days.

(21) Appl. No.: 16/825,219

(22) Filed: Mar. 20, 2020

(65) Prior Publication Data
US 2020/0297156 A1 Sep. 24, 2020

(30) Foreign Application Priority Data
Mar. 21, 2019 (EP) .................................... 19164399

(51) Int. Cl.
A47J 31/52 (2006.01)
A47J 31/60 (2006.01)
(Continued)

(52) U.S. Cl.
CPC .............. *A47J 31/525* (2018.08); *A23F 5/04* (2013.01); *A23F 5/26* (2013.01); *A47J 31/002* (2013.01);
(Continued)

(58) Field of Classification Search
CPC ........ A47J 31/525; A47J 31/002; A47J 31/42; A47J 31/605; A23F 5/04; A23F 5/26; C02F 1/001; C02F 1/68
See application file for complete search history.

(56) References Cited

U.S. PATENT DOCUMENTS 3,328,894 A * 7/1967 Smith, Jr. ............... A23P 30/38
99/468
4,528,200 A * 7/1985 Coleman ................ A23F 5/267
426/74
(Continued)

FOREIGN PATENT DOCUMENTS

| DE | 19700368 | * | 7/1998 |
| WO | 2013/124188 A1 | | 8/2013 |
| WO | 2013/158041 A1 | | 10/2013 |

OTHER PUBLICATIONS

English Translation for DE19700368 published Jul. 1998.*
EPO: "European Search Report"; Serial No. EP 19 16 4399; dated Sep. 10, 2019 (Search report in related European case).

*Primary Examiner* — Anthony J Weier
(74) *Attorney, Agent, or Firm* — Bryan W. Bockhop; Bockhop Intellectual Property Law, LLC (57) ABSTRACT

A method of brewing coffee includes the following steps:—requesting a user to select a coffee-based beverage on an input device coupled to a coffee brewing apparatus; selecting a suitable water recipe from a database comprising a plurality of water recipes suited for brewing coffee, wherein the selected water recipe is suited to the selected coffee-based beverage, wherein the water recipe defines a set mineral concentration of brewing water to be prepared; requesting a water preparation unit to prepare a brewing water based on the water recipe, wherein the water preparation unit is adapted to mineralize the brewing water according to the set mineral concentration of the water recipe; preparing brewing water based on the water recipe; and brewing the coffee-based beverage with the brewing water prepared according to the water recipe.

20 Claims, 4 Drawing Sheets

(51) Int. Cl.
  *A47J 31/42* (2006.01)
  *A47J 31/00* (2006.01)
  *A23F 5/04* (2006.01)
  *A23F 5/26* (2006.01)
  *C02F 1/00* (2006.01)
  *C02F 1/68* (2006.01)

(52) U.S. Cl.
  CPC ............ *A47J 31/42* (2013.01); *A47J 31/605* (2013.01); *C02F 1/001* (2013.01); *C02F 1/68* (2013.01)

(56) References Cited

U.S. PATENT DOCUMENTS

| | | | | |
|---|---|---|---|---|
| 5,798,040 | A * | 8/1998 | Liang | B01D 24/007 210/252 |
| 8,790,513 | B1 * | 7/2014 | Boulter | C02F 9/00 210/104 |
| 10,674,859 | B2 * | 6/2020 | Bissen | A47J 31/402 |
| 2004/0241299 | A1 * | 12/2004 | Zhang | C02F 1/68 426/435 |
| 2008/0131562 | A1 * | 6/2008 | Korber | A23F 3/14 426/597 |
| 2009/0011088 | A1 * | 1/2009 | Beeman | A23F 3/16 426/66 |
| 2012/0125204 | A1 * | 5/2012 | Del Sante | A47J 31/605 99/290 |
| 2014/0166498 | A1 * | 6/2014 | Orolin | C02F 1/4672 210/243 |
| 2014/0314921 | A1 * | 10/2014 | Kuempel | A47J 31/56 426/433 |
| 2015/0201796 | A1 * | 7/2015 | Kuempel | A47J 31/521 99/283 |
| 2016/0095464 | A1 | 4/2016 | Jones | |
| 2017/0327393 | A1 * | 11/2017 | Cornwell | C02F 1/688 |
| 2018/0303271 | A1 | 10/2018 | Glucksman et al. | |
| 2018/0338507 | A1 * | 11/2018 | Westmoreland | A47J 31/002 |
| 2020/0050634 | A1 * | 2/2020 | Bissen | G16H 20/60 |
| 2020/0055753 | A1 * | 2/2020 | Minor | C02F 1/687 |
| 2020/0154728 | A1 * | 5/2020 | Lin | C02F 1/68 |
| 2020/0178725 | A1 * | 6/2020 | Foglia | A47J 31/461 |

* cited by examiner

| Brewing water recipe: | coffee-type beverage 1 |
|---|---|
| sodium bicarbonate | $x_1$ µl/l |
| potassium bicarbonate | $x_2$ µl/l |
| magnesium chloride | $x_3$ µl/l |
| magnesium sulfate | $x_4$ µl/l |
| calcium chloride | $x_5$ µl/l |

Figure 3

| Brewing water recipe: | coffee-type beverage 2 |
|---|---|
| sodium bicarbonate | $x_6$ µl/l |
| potassium bicarbonate | $x_7$ µl/l |
| magnesium chloride | $x_8$ µl/l |
| magnesium sulfate | $x_9$ µl/l |
| calcium chloride | $x_{10}$ µl/l |
| sodium bicarbonate | $x_{11}$ µl/l |

METHOD AND APPARATUS FOR PREPARING WATER FOR COFFEE BREWING

CROSS-REFERENCE TO RELATED APPLICATION(S)

This application claims the benefit of EP Patent Application No. EP19164399.8, filed Mar. 21, 2019, the entirety of which is hereby incorporated herein by reference.

BACKGROUND OF THE INVENTION

1. Field of the Invention

The present invention relates to a method of preparing water for coffee brewing, particularly a water that is mineralized such that the lifespan of the coffee brewing machine is increased and the taste of the particularly coffee beverage is optimized.

2. Description of the Related Art

Generally, coffee is brewed in so-called coffee machines. Grounded coffee is inserted in a brewing chamber or into a filter in which boiling water is supplied. Thereafter, the coffee is output into a user vessel such as a cup or a coffee pot. Generally, locally available tap water is boiled and used as brewing water. In some coffee machines the user can adjust the amount of grounded coffee powder supplied into the brewing chamber for adapting the taste of the coffee. Coffee machines used in private homes, offices, bars and restaurants are known by the person skilled in the art.

The document "The Role of Dissolved Cations in Coffee Extraction", Christopher H. Hendon, Lesley Colonna-Dashwood, and Maxwell Colonna-Dashwood, ACS publications, 2014 American Chemical Society, May 6, 2014 describes the state of the art of water used for brewing coffee. The paper summarizes that the flavorsome compounds in coffee beans exist in the form of aprotic charge neutral species, as well as a collection of acids and conjugate salts. The dissolution and extraction of these organic molecules is a process dependent on the dissolved mineral content of the water. It is known that different rates and compositions of coffee extraction are achieved through the control of the water "impurities", $Na+$, $Mg2+$, and $Ca2+$, which coordinate to nucleophilic motifs in coffee.

A high content of hydrogen carbonate (alkalinity) in brewing water leads to scaling in coffee machines. Therefore, ion exchangers are used to filter water for coffee machines. Generally, by water having a high total-hardness and/or a high alkalinity decarbonization filters having a weak acid cation exchanger buffered by sodium, potassium or magnesium are used. These filters reduce the alkalinity of the water, such that there is no limescale build-up in the coffee machine. These filters have the disadvantage that carbonic acid is generated during the ion exchange. The carbonic acid is solved in the water and influences significantly the coffee extraction process, since the carbonic acid expands with high temperature in the coffee powder during the coffee extraction process and changes the pressure environment during extraction significantly. The extraction occurs under a higher pressure and changes the coffee taste significantly. The significantly higher pressure during extraction causes extraction of further substances affecting the final taste of the coffee negatively. Further, during the coffee extraction process at high temperature bases such as sodium hydroxide, potassium hydroxide or magnesium hydroxide are formed when using sodium, potassium or magnesium buffered ion exchangers for water treatment. These substances increase the pH of the water significantly and the coffee extraction is done under highly alkaline conditions and the taste of the coffee is affected negatively.

Alternatively, water softening systems are used for reducing water hardness. Such water softening systems reduces hardness by removing calcium and magnesium ions and substituting them by sodium ions. Sodium is a cation that does not have a too positive influence on the taste of coffee, whereas calcium and magnesium ions are influencing the taste positively. If water hardness is removed from the water, sodium ions are introduced into the water. Thereby sodium bicarbonate, sodium sulfate, sodium chloride and the like are formed by substituting calcium ions and magnesium ions by sodium ions. Sodium bicarbonate can dissociate to sodium hydroxide at high temperatures. The pH value of such water is highly alkaline. This is a disadvantage for coffee extraction, since substances of high molecular weight present in the coffee swell at high alkalic pH-value, which increases the pressure in the coffee extraction chamber and affects the extraction result negatively compared to an extraction with tap water with a pH value in the range of 6.5 to 7.5. The alkalic pH-value of the water causes also that the coffee acids (e.g. latic acid, malic acid, citric acid, quinic acid) are neutralized and the coffee tastes stale.

It is an object of the present invention to prepare brewing water for coffee machines that does not negatively affect the taste of the coffee and that reduces scaling.

SUMMARY OF THE INVENTION

The object of the present invention is achieved by a method according to claim 1 or a method of claim 13 and a coffee brewing apparatus according to claim 15. The depending claims relate to preferred embodiments.

A method of brewing coffee comprises the step of requesting a user to select a coffee-based beverage on an input device coupled to the coffee brewing apparatus. The term "coffee-based beverage" comprise a coffee beverage type, a coffee bean-type, a coffee bean-type roasted by the predetermined roasting parameter etc. The coffee beverage type may be coffee, cappuccino, espresso or the like. The input device may be part of the coffee brewing apparatus, such as a user interface of the coffee brewing apparatus. The method selects a suitable water recipe from a database comprising a plurality of water recipes suited for brewing coffee. The selected recipe is particularly suited to the selected coffee-based beverage. Each water recipe defines a set mineral concentration of brewing water to be prepared. The method requests a water preparation unit to prepare the brewing water based on the water recipe, wherein the water preparation unit is adapted to mineralize the brewing water according to the set mineral concentration of the water recipe. The method prepares the brewing water based on the water recipe by the water preparation unit. The method brews the coffee with the brewing water prepared according to the water recipe with the coffee brewing apparatus.

The present invention has the advantage that a set mineral concentration best suited for the selected coffee-based beverage is used for preparing the brewing water and brewing the coffee. Thereby, the taste of the coffee can be improved, and damage of the coffee brewing apparatus may be avoided.

The step of preparing brewing water based on the water recipe includes the step of adding at least two minerals to the brewing water as defined by the water recipe. One of the two minerals may comprise calcium and/or magnesium combined with chloride and/or sulfate and one mineral may contain sodium and/or potassium hydrogen carbonate. The water hardness is determined by calcium and magnesium ions. The alkalinity is determined by the hydrogen carbonate ions. Preferably, the two minerals added to the brewing water form calcium hydrogen carbonate and magnesium hydrogen carbonate. Thereby, both the water hardness as well as the alkalinity may be adjusted. In one embodiment, potassium hydrogen carbonate and sodium hydrogen carbonate may be added to the brewing water forming the calcium hydrogen carbonate and magnesium hydrogen carbonate.

The step of preparing brewing water based on the water recipe includes the step of filtering water drawn from a water source before the step of adding at least two minerals to the brewing water as defined by the water recipe. The water source may be tap water.

In a preferred embodiment the step of filtering water drawn from a water source includes the step of demineralizing the water drawn from the water source. The step of adding at least two minerals to the brewing water includes the step of adding minerals stored in at least two mineral reservoirs to the demineralized water. Each mineral reservoir stores a fluid solving at least one type of minerals and each mineral reservoir is connected by a dosing device to a conduit in which the demineralized water flows. The demineralizing step may completely demineralize the water. The filtering may be carried out by a reverse osmosis filter. The inventive method introduces the minerals by the dosing devices into the permeate.

Minerals which can be used and combined are sodium bicarbonate, potassium bicarbonate, magnesium chloride, magnesium sulfate and calcium chloride. It is known that a defined alkalinity in the water present as calcium hydrogen carbonate and/or magnesium hydrogen carbonate improve the taste of coffee. The amount must not be too high in order to prevent scaling of the machine and neutralization of all acids present in coffee. The TDS may be in a range of 75 ppm to 400 ppm.

The set concentration of at least the calcium and magnesium ions of the selected water recipe may correspond the actual concentration of at least the calcium and magnesium ions of the water used for brewing coffee during the process of adjusting the roasting parameters. The roaster of coffee adjusts the roasting method by brewing coffee after the coffee has been roasted by selected roasting parameters. Therefore, the roaster brews coffee with the locally available water and the coffee roasted by the selected parameters. The roaster iteratively adjusts the roasting parameters and again brews coffee with the newly adjusted parameter and tastes the coffee. This process is repeated, until the taste result is satisfactory. However, the roasting parameters are only optimized to the locally available water. Therefore, the invention proposes to generate a brewing water in which the concentration of at least the calcium and/or magnesium ions and the content of hydrogen carbonate correspond to the actual concentration of at least the calcium and magnesium ions and preferably the content of hydrogen carbonate of the water used by the roaster during optimizing the roasting parameters. In a further embodiment also the sulfate concentration of the brewing water may correspond to the sulfate concentration of the water used by the roaster during selecting adjusting the roasting parameters.

In one embodiment the brewing water may comprise a total hardness higher than 15 ppm calcium carbonate and lower than 90 ppm calcium carbonate, preferably 58 ppm and lower than 78 ppm CaCO3, more preferred approximately 68 ppm. Total hardness of the brewing water may preferably not exceed 190 ppm calcium carbonate. Additionally, alkalinity of the brewing water may range between 20 ppm calcium carbonate to 80 ppm calcium carbonate, between 30 ppm and 50 ppm CaCO3, more preferred preferably approximately 40 ppm calcium carbonate. Additionally, the pH value of the brewing water may range between 6.5 and 7.5, preferably 7.0. The sodium and/or potassium concentration ranges from 10 to 150 ppm, preferably between 10 to 100 ppm, more preferred lower than 100 ppm. The sodium concentration may range between 10 to 150 ppm, preferably 100 ppm.

In one embodiment the method may activate a user interface for adapting the set concentration of at least one mineral of the brewing water for generating a user defined water recipe comprising at least one user defined set concentration of minerals. The method may prepare the brewing water based on the user defined water recipe comprising at least one user defined set concentration of minerals. The user defined recipe may be stored in the database. This embodiment has the advantage, that the user can adapt an existing water recipe and the set mineral concentrations stored therein to his personal preference. The user interface may comprise a physical control or an image of a user interface displayed on a display.

The method may propose an existing water recipe to the user and the user can optimize the existing water recipe based on his personal preferences and the existing water recipe. The method may further store the user optimized recipe and associate the user optimized water recipe. The method may further identify the user and propose the user optimized water recipe to the user.

The step of preparing the brewing water may comprise the step of outputting the beverage in at least three fractions, wherein the first fraction and the third fraction comprise demineralized water. In one embodiment the second fraction comprises a mineralization that ensures that the brewing water comprising the first fraction, second fraction and third fraction comprises the set mineralization. In another embodiment the first and second fraction are discarded and the third fraction comprises the set mineralization. These steps ensure that both in the water preparation unit and the brewing apparatus no water stagnates that is mineralized. This ensures that no minerals can precipitate within the coffee brewing apparatus or the water preparation unit. Further, correct mineralization is ensured, since no mineralized water stagnates in the coffee brewing apparatus and the water preparation unit that may add undesired minerals to the brewing water.

In another embodiment the step of preparing the brewing water comprises the step of outputting the brewing water in at least two fractions, wherein the first fraction comprises demineralized water. In one embodiment the second fraction comprises a mineralization that ensures that the brewing water comprising the first fraction and the second fraction comprises the set mineralization. In another embodiment the first fraction is discarded, and the second fraction comprises the set mineralization.

Alternatively, the step of preparing the brewing water comprises the step of outputting the brewing water in at least two fractions, wherein the second fraction comprises demineralized water. In one embodiment the first fraction comprises a mineralization that ensures that the brewing water comprising the first fraction and second fraction comprises the set mineralization. In another embodiment the second fraction is discarded, and the first fraction comprises the set mineralization.

The invention discloses a method of brewing coffee with water prepared by a predetermined water recipe. At least one property of the coffee brewed by the predetermined water recipe is measured by a sensor. An optimized water recipe is determined based on the at least one measured property and the predetermined water recipe. This method allows to optimize a water recipe to a particular type of coffee-based beverage.

The following steps may be executed at least once: brewing coffee with water prepared by the optimized water recipe, measuring at least one property of the coffee prepared by the optimized or a post-optimized water recipe by a sensor and determining the post-optimized water recipe based on the at least one measured property of the predetermined water recipe. Thereby, the method can iteratively adjust the water recipe and set ion concentration to improve taste of the particular coffee-based beverage.

The set ion concentration of at least the calcium and/or magnesium ions and preferably hydrogen carbonate of the predetermined water recipe may correspond to the actual mineral concentration of at least the calcium and/or magnesium ions and preferably hydrogen carbonate may correspond to the ion concentration of the of the water used for brewing coffee during the process of adjusting the roasting method of the coffee.

Alternatively or additionally, the predetermined water may comprise a total hardness higher than 15 ppm calcium carbonate and lower than 90 ppm calcium carbonate, preferably 58 ppm and lower than 78 ppm CaCO3, more preferred approximately 68 ppm. Total hardness may preferably not exceed 190 ppm calcium carbonate. Additionally, alkalinity of the predetermined water may range between 20 ppm calcium carbonate to 80 ppm calcium carbonate, between 30 ppm and 50 ppm CaCO3, more preferred preferably approximately 40 ppm calcium carbonate. Additionally, the pH value of the predetermined water may range between 6.5 and 7.5, preferably 7.0. The sodium and/or potassium concentration of the predetermined water may range from 10 to 150 ppm, preferably between 10 to 100 ppm, more preferred lower than 100 ppm. The sodium concentration may range between 10 and 150 ppm, preferably 100 ppm.

The set mineralization of the predetermined water recipe, the optimized water recipe and/or the post-optimized water recipe may be adapted by the user as described above with reference to the brewing water.

The invention discloses also a method of roasting coffee comprising the steps of demineralizing water, adding at least two minerals to the demineralized water for generating roasting water, roasting coffee beans by at least one first roasting parameter and brewing coffee with the roasting water and the coffee roasted with the at least one first roasting parameter. Thereafter at least one parameter of the brewed coffee is determined. The at least one roasting parameter is adapted based on the coffee brewed with the roasting water and the coffee roasted with the at least one first roasting parameter. This method has the advantage that coffee is brewed and tasted during roasting with a predetermined mineralization. Further, the roasting parameters are determined without influence of demineralization of the local tap water. Such method also has the advantage that coffee taste can be assessed more objective and that the same water can be used during brewing coffee for a user as for determining the best possible roasting parameters.

It is to be understood that the roasting water may be generated by the same method steps as described above for the brewing water.

One of the two minerals may comprise calcium and/or magnesium combined with chloride and/or sulfate and one mineral may contain sodium and/or potassium hydrogen carbonate.

The step of preparing roasting water based on the water recipe includes the step of filtering water drawn from a water source before the step of adding at least one two minerals to the roasting water as defined by the water recipe. The water source may be tap water.

In a preferred embodiment the step of filtering water drawn from a water source includes the step of demineralizing the water drawn from the water source. The step of adding at least one two minerals to the roasting water includes the step of adding minerals stored in at least two mineral reservoirs to the demineralized water. Each mineral reservoir stores a fluid solving at least one type of minerals and each mineral reservoir is connected by a dosing device to a conduit in which the demineralized water flows. The demineralizing step may completely demineralize the water. The filtering may be carried out by a reverse osmosis filter. The inventive method introduces the minerals by the dosing devices into the permeate.

The roasting water may comprise a total hardness higher than 15 ppm calcium carbonate and lower than 90 ppm calcium carbonate, preferably 58 ppm and lower than 78 ppm CaCO3, more preferred approximately 68 ppm. Total hardness may preferably not exceed 190 ppm calcium carbonate. Additionally, alkalinity of the roasting water may range between 20 ppm calcium carbonate to 80 ppm calcium carbonate, between 30 ppm and 50 ppm CaCO3, more preferred preferably approximately 40 ppm calcium carbonate. Additionally, the pH value of the roasting water may range between 6.5 and 7.5, preferably 7.0. The sodium and/or potassium concentration of the predetermined water may range from 10 to 150 ppm, preferably between 10 to 100 ppm, more preferred lower than 100 ppm. The sodium concentration may range between 10 and 150 ppm, preferably 100 ppm.

In one embodiment the method may activate a user interface for adapting the set concentration of at least one mineral of the roasting water for generating a roasting user defined water recipe comprising at least one user defined set concentration of minerals. The method may prepare the roasting water based on the roasting user defined water recipe comprising at least one user defined set concentration of minerals. The roasting user defined recipe may be stored in the database. This embodiment has the advantage, that the roasting user can adapt an existing water recipe and the set mineral concentrations stored therein to his personal preference. The user interface may comprise a physical control or an image of a user interface displayed on a display.

The roasting user defined water recipe may be stored in the database. The roasting user defined water recipe may be retrieved by a user (consumer) consuming the coffee-type beverage, which is brewed by coffee roasted with the roasting process. The user may have purchased the coffee roasted with the roasting process. The user may retrieve the roasting user defined water recipe by a bar code, QR code or any other suitable URL and load it as new water recipe in a (his) coffee brewing apparatus. The bar code, QR code or any other suitable URL may be arranged on the coffee bag and the user may scan the bar code, QR code or any other suitable URL by an intelligent mobile device and transmit the bar code, QR code or any other suitable URL and/or the roasting user defined water recipe retrieved therefrom to the (his) coffee brewing apparatus. Thus, the user may use the set mineralization defined by roasting user defined water recipe for generating brewing water and brew his coffee. Thus, the user brews his coffee-type beverage with the same water (mineral concentration) as the person in charge of roasting the coffee.

The invention also discloses a computer program product that when loaded into a memory of a computer comprising a processor executes the above described methods.

The invention also discloses a coffee brewing apparatus comprising a brewing element, a reception element and a controller. The brewing element comprises a brewing water inlet, a coffee powder inlet and an outlet for outputting brewed coffee. The reception element is adapted to receive from a user interface a user interface for selecting a coffee-based beverage. The controller is adapted to receive from the reception element the coffee-based beverage selected by the user. The controller is adapted to retrieve from a database a suitable water recipe that is suited to the selected coffee-based beverage, wherein the water recipe defines a set mineral concentration of water to be prepared. The controller is adapted to control a water preparation unit to prepare brewing water based on the water recipe, wherein the water preparation unit mineralizes the water according to the water recipe. The controller can transmit to the water preparation unit a command indicating the water recipe for preparing the water. The controller may also transmit a command to the water preparation unit indicating the amount of brewing water to prepare.

Finally, the coffee brewing apparatus further comprises a coffee outlet connected to the outlet of the brewing element for outputting the coffee-based beverage into a user vessel, such as a cup.

The user interface may be external or internal to the coffee brewing apparatus. The water preparation unit may be external or internal to the coffee brewing apparatus.

The coffee brewing apparatus may be further embodied as described above with respect to the method. The coffee brewing apparatus comprises the same advantages as discussed above with reference to the method.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
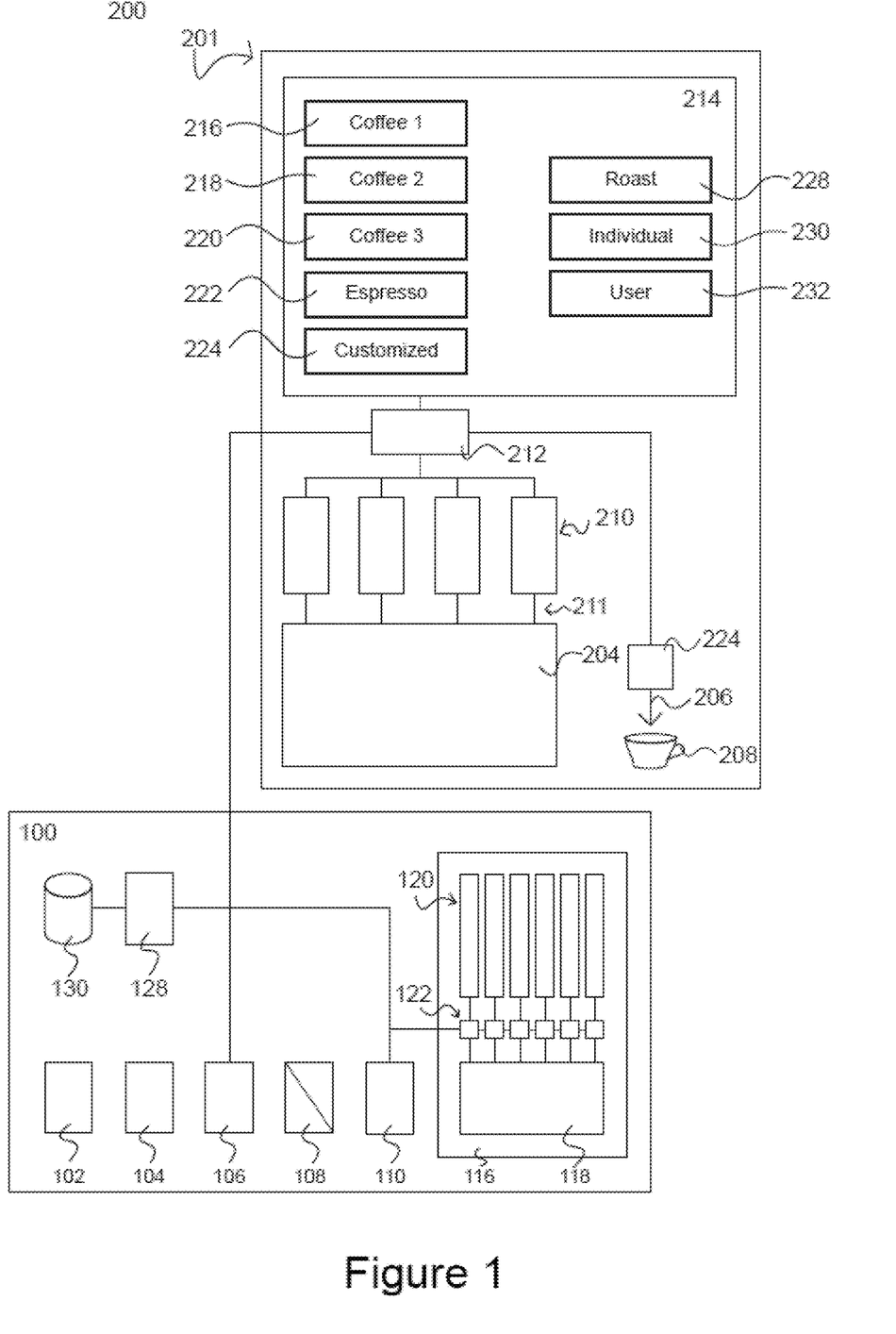
FIG. 1 shows a schematic view of one embodiment of the invention.

The coffee brewing apparatus 200 comprising a water preparation unit 100 and a coffee brewing unit 201 as well as the underlying method according to the present invention and the operation thereof according to the present invention is now described in further detail with reference to FIG. 1. The water dispenser 100 is connected to a water source 102 which may be tap water or a tank. A prefilter, such as an active carbon filter 104 is connected to the water source. A pump 106 is connected between the prefilter 104 and a reverse osmosis filter 108. The pump 106 pumps water under high-pressure such as 8 bar to 20 bar into the reverse osmosis filter 108, wherein the concentrate is discarded or drained and the permeate is passed to beverage preparation elements 110 and 116 described in further detail below.

The beverage preparation elements 110, 116 comprise a beverage tempering device 110 for tempering the beverage to the desired temperature (set temperature). The tempering device 110 may be a flow-type tempering device. The beverage entering the tempering device 110 at the inlet comprises the same flow rate as beverage output by the tempering device 110 at the outlet.

The water flows from the tempering device 110 to the mineralization device 116. The permeate output by the reverse osmosis filter 108 is demineralized water and is remineralized by the mineralization device 116. The beverage passes through a mixing portion 118, in which ions and/or minerals and/or trace elements are added to the beverage. Such mixing portion is disclosed in the European patent applications EP 17203425.8 and EP 18207971.5, wherein the disclosure thereof is incorporated into this application in its entirety into the present application.

The ions and/or minerals and/or trace elements are stored in a plurality of mineralization bottles 120, wherein each mineralization bottle 120 comprises a predetermined type of minerals and/or trace elements or comprises a plurality of predetermined types of minerals and/or trace elements. The minerals and/or trace elements are solved in a fluid, preferably water. The mineralization bottles and an extraction device are disclosed in the European patent application EP 17202640.3, which is incorporated by reference in its entirety into the present application.

Each mineralization bottle 120 is connected to a micro-metering pump 122 that delivers a predetermined amount of minerals and/or trace elements stored in the mineralization bottle 120 into the mixing portion 118 and thus the beverage. Such micro-metering pump 122 is disclosed in the European patent application EP 18210743.3, which is incorporated by reference in its entirety into the present patent application.

The water preparation unit 100 further comprises a water preparation controller 128 connected to the pump 106, the tempering device 110, and the micro-metering pumps 122. Thus, the water preparation controller 128 can control the pressure in the beverage preparation devices 110 and 116 by controlling the pump. Further, the water preparation controller 128 can control the temperature of the beverage output by the water preparation unit 100 by controlling the tempering device 110. Further, the water preparation controller 128 may control the mineral concentration (mineralization) of the beverage by controlling the mineralization device 116, particularly by controlling the micro-metering pumps 122.

According to the present invention the water preparation controller 128 controls the beverage preparation elements 110 and 116 such that each beverage generated by the beverage preparation elements comprises an individual mineralization and individual temperature.

The coffee brewing apparatus 200 further comprises the coffee brewing unit 201, the coffee brewing unit 201 comprises a brewing element 204 in which water prepared by the water preparation unit 100 is supplied. The water is supplied with a set mineralization as stipulated by the water recipe stored in the database 130. The brewing element 204 is connected to a plurality of coffee powder inlets 211 connected to coffee reservoirs 210. Each coffee reservoir 210 is filled with a different type of coffee powder.

An outlet of the brewing element 204 is connected to a sensor arrangement 224 comprising at least one sensor for measuring a property of the brewed coffee. The sensor arrangement 224 may comprise a pH sensor, one or more ion selective electrodes, one or more ion sensitive conductivity sensors, water hardness sensors, or the like.

After the coffee-based beverage past the sensor arrangement 224 the coffee-based beverage 206 is output by a nozzle 206 to a cup (user vessel) 208.

A controller 212 of the coffee brewing unit 201 is connected to the plurality of coffee reservoirs 210 for metering the appropriate amount of coffee into the brewing element 204. The controller is also connected to a user interface 214. The controller displays on the user interface 214 a plurality of buttons 216, 218, 220, 222, 226 that may be selected by a user. Particularly, the controller 212 displays a selection button for choosing a first coffee-based beverage 216, a second coffee-based beverage 218 and a third coffee-based beverage 220. The first coffee-based beverage, the second coffee-based beverage 218 and the third coffee-based beverage 220 are in this embodiment regular coffee that is based on different types of coffee beans and/or roasting process. The coffee-type of beverage that may be selected by the button 220 type is espresso and thus a different type of beverage.

The button 226 allows to optimize a water recipe stored in the database 130 for a particular type of the coffee-based beverage mentioned above.

The controller 212 of the coffee brewing unit 201 is also connected to the water preparation controller 128 and transmits the user selection of a coffee-based beverage to the water preparation controller 128.

Next, the operation of the coffee brewing unit 201 and the water preparation unit 100 is discussed in more detail. As soon as the controller 212 of the coffee brewing unit 201 detects that the user has selected a type of coffee-based beverage 216, 218, 220, 222, the controller 212 of the coffee preparation unit 201 transmits the coffee-based beverage selected by the user to the water preparation controller 128.

The database 130 comprises a plurality of water recipe for cooking coffee. The water preparation controller 128 selects the best suited water recipe for the coffee-based beverage selected by the user and controls the pump 106 and the micro-metering pumps 122 such that the water is mineralized with the set mineralization as defined in the selected water recipe. One mineralization bottle 120 may be filled with sodium bicarbonate, another mineralization bottle 120 may be filled with potassium carbonate, a further mineralization bottle 120 may be filled with magnesium chloride, a still further mineralization bottle 120 may be filled with magnesium sulfate and another mineralization bottle 120 may be filled with calcium chloride. Thereby, the micro-metering pumps 122 meter the mineralization fluids stored in the mineralization bottles 120 under control of the beverage preparation controller 128 into the mixing portion 118, such that the brewing water comprises the set mineralization as defined in the water recipe.

In one embodiment the water preparation unit 100 outputs only completely demineralized water in a first fraction (first portion) after the starting the water preparation in order to flush conduits between the mixing portion 118 and the brewing element 204. Thereafter, mineralized water is output from the mixing portion 118 to the brewing element 204 in a second fraction (second portion). Then, in a third fraction (third portion) again completely demineralized water is output by the water preparation unit 100 for ensuring that no mineralized water can stagnate in the water preparation unit 100 and coffee brewing unit 201 as well as the conduits therebetween. The demineralized water and the mineralized water fractions are prepared such that the water supplied into the brewing element 204 comprises the set mineralization. In other words, since only one of three fractions of water output by the water preparation unit 100 is mineralized, the complete outputted water comprising the first demineralized fraction, the second mineralized fraction and the third demineralized fraction comprises the set mineralization as defined by the water recipe, when this water is supplied to the brewing element 204.

The water recipe associated to one coffee-based beverage 216, 218, 220, 222 may comprise the same ion concentration at least for the calcium and magnesium and hydrogen carbonate ions as the brewing water that was used during roasting for tasting the coffee. During roasting, coffee is first roasted with first roasting parameters. The coffee roasted by the first roasting parameter is brewed with a locally available water, generally the local tap water. Thereafter, this coffee is tasted by the person in charge of the roasting process. After the first tasting the person in charge for roasting iteratively optimizes the roasting parameters by successively roasting coffee with the optimized parameters and brewing coffee with the available water, such as local tap water. Therefore, the roasting process is optimized for the water available during roasting. Since the same ion concentration, at least as far as the calcium and magnesium ions and hydrogen carbonate are concerned, a particularly suited ion concentration can be provided for optimal taste experience by the user drinking the coffee-based beverage.

Figure 3:
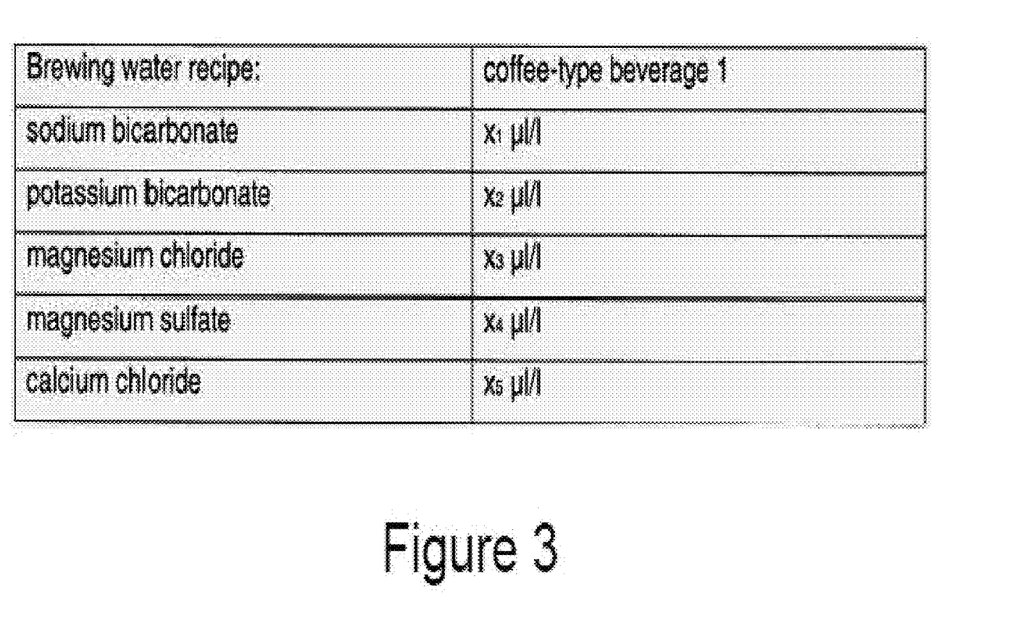
FIG. 3 shows a brewing water recipe for a first coffee-based beverage.
Figure 4:
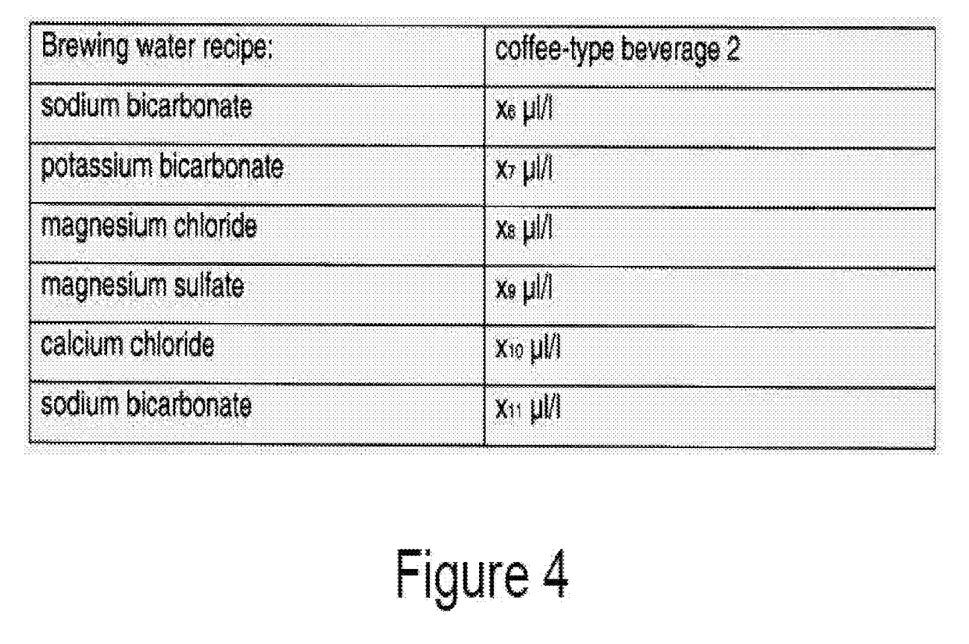
FIG. 4 shows a brewing water recipe for a first coffee-based beverage.

FIG. 3 shows a brewing water recipe for a first coffee-based beverage, and FIG. 4 shows a brewing water recipe for a first coffee-based beverage according to one embodiment of the invention. In this embodiment the water recipes define the amount of minerals to meter into the demineralized water.

The coffee brewing apparatus 200 is also adapted to determine an optimized water recipe for a particular type of coffee-based beverage. If the user presses the bottom 226 requesting optimization of a water recipe and thereafter one of the buttons 216, 218, 220, 222 for selecting a coffee-based beverage the coffee brewing apparatus 200 starts an optimization process. The controller 212 of the coffee brewing unit transmits a message to the water preparation controller 128 that a water recipe shall be optimized for a particular coffee-based beverage. The water preparation controller 128 selects a suitable water recipe in the database. The water recipe may be the water recipe used for tasting the coffee-based beverage during roasting. Alternatively the water recipe may be a water recipe recommended by coffee sommeliers comprising a total hardness ranging from 15 ppm to 90 ppm calcium carbonate, an alkalinity ranging from approximately 20 ppm to approximately 80 ppm calcium carbonate, preferably ranging from approximately 35 ppm calcium carbonate to approximately 45 ppm calcium carbonate. In one embodiment the selected water recipe may be completely demineralized water.

The water preparation unit 100 prepares the water according to the selected water recipe as described above and supplies the prepared water to the brewing element 204. The selected type of coffee is metered into the brewing element 204 and brewed. Thereafter, the coffee-based beverage is supplied to the sensor arrangement 224. The sensor arrangement 224 may determine properties of the brewed coffee with pH sensor, a plurality of ions sensitive sensors and the like. The measure data is transmitted to the controller 212 of the coffee brewing unit 201.

Thereafter, the inventive method implemented in the coffee brewing apparatus, for example the controller 212 of the coffee brewing unit 201 determines a new set concentration of minerals of the water recipe. This data may be transmitted to the water beverage controller 128 and water is prepared by the water preparation unit 100 based on the changed concentration of ions. Coffee is brewed in the brewing element 204 using the water having the changed set concentration of minerals. Thereafter, the brewed coffee is evaluated by the sensor arrangement 224 and the data is transmitted to the controller 212 of the coffee brewing unit 201. The process of optimizing the water recipe and/or the set concentration of minerals of the brewing water is continued until the result as determined by the sensor arrangement 224 is satisfactory.

The controller may display on the user interface 214 a button 228 for preparing roasting water. If the user presses the button 228 for preparing roasting water, the controller 212 of the coffee brewing unit 201 transmits a message to the water preparation controller 128 requesting preparation of roasting water optimized for roasting coffee and stored in the database 130. The water preparation controller 128 retrieves the water recipe for preparing roasting water from the database 130 and prepares the roasting water as described above in the context of preparing brewing water. Particularly, the water preparation unit 100 draws water from a source 102, such as tap water and completely demineralizes the water drawn from the water source using the reverse osmosis filter 108. Thereafter, the water preparation unit 108 remineralizes the demineralized water by metering predetermined amounts of mineralization fluids stored in the respective mineralization bottles 120 into the mixing portion 118. The predetermined amounts of minerals are defined by the set ion concentrations in the water recipe for roasting water. The roasting water may be heated in the tempering device 110.

The roasting water is supplied into the brewing chamber 204 of the water preparation unit 201. The controller 212 instructs the coffee reservoir 210 comprising the grounded coffee roasted with first roasting parameters to supply this grounded coffee into the brewing chamber 204. Thereafter, the brewed coffee is output to a user vessel 208 by the nozzle 206. The brewed coffee is tasted by the user in charge of roasting.

In one embodiment the sensor arrangement 224 may measure at least one parameter of the coffee brewed with the roasting water and the controller 212 may display this parameter on the user interface 214, after the parameter measured by the sensor arrangement 224 is transmitted to the controller 212. The controller 212 may also display a recommendation for adapting roasting parameter based on the parameter measured by the sensor arrangement 224.

In the next step the person in charge of roasting may change at least one roasting parameter, roast the coffee beans based on the changed roasting parameter, ground the roasted beans and repeat the procedure described above for preparing coffee-based on the coffee roasted with the at least one change parameter and the roasting water prepared according to the roasting water recipe stored in the database 130.

Preferably, the roasting water comprises a total hardness higher than 15 ppm calcium carbonate and lower than 90 ppm calcium carbonate, preferably 58 ppm and lower than 78 ppm CaCO3, more preferred approximately 68 ppm. Total hardness may preferably not exceed 190 ppm calcium carbonate. Additionally, alkalinity of the roasting water may range between 20 ppm calcium carbonate to 80 ppm calcium carbonate, preferably between 30 ppm and 50 ppm CaCO3, more preferred preferably approximately 40 ppm calcium carbonate. Additionally, the pH value of the roasting water may range between 6.5 and 7.5, preferably 7.0. The sodium and/or potassium concentration of the predetermined water may range from 10 ppm to 150 ppm, preferably between 10 ppm to 100 ppm, more preferred lower than 100 ppm. The sodium concentration may range between 10 and 150 ppm, preferably 100 ppm.

The user may also individualize the brewing water by selecting the button 230. In one embodiment, if the user selects the button 230 and thereafter one of the selection buttons 216, 218, 220, 222 for the coffee-type beverage, the controller 212 displays a set concentration adaption user interface 234 shown in FIG. 2. The set concentration adaption user interface 234 comprises a plurality of control elements 236, 240, 244, 248, 252 for individually adapting the set concentration by sliders 238, 242, 246, 250, 256 such as for calcium chloride, magnesium chloride, magnesium sulfate, sodium bicarbonate and potassium bicarbonate. The controller 212 displays as default values the set ion concentration defined for the water recipe for the respective coffee-type beverage 216, 218, 220, 222 and the user is allowed to change the set ion concentration of one or more minerals by the set concentration adaption user interface 234. As soon as the user has finalized his optimizations, he may press the apply button 258 and the brewing water is prepared as described above based on the user optimized set ion concentration and the coffee is brewed as described above and output to the user vessel 208.

Figure 2:
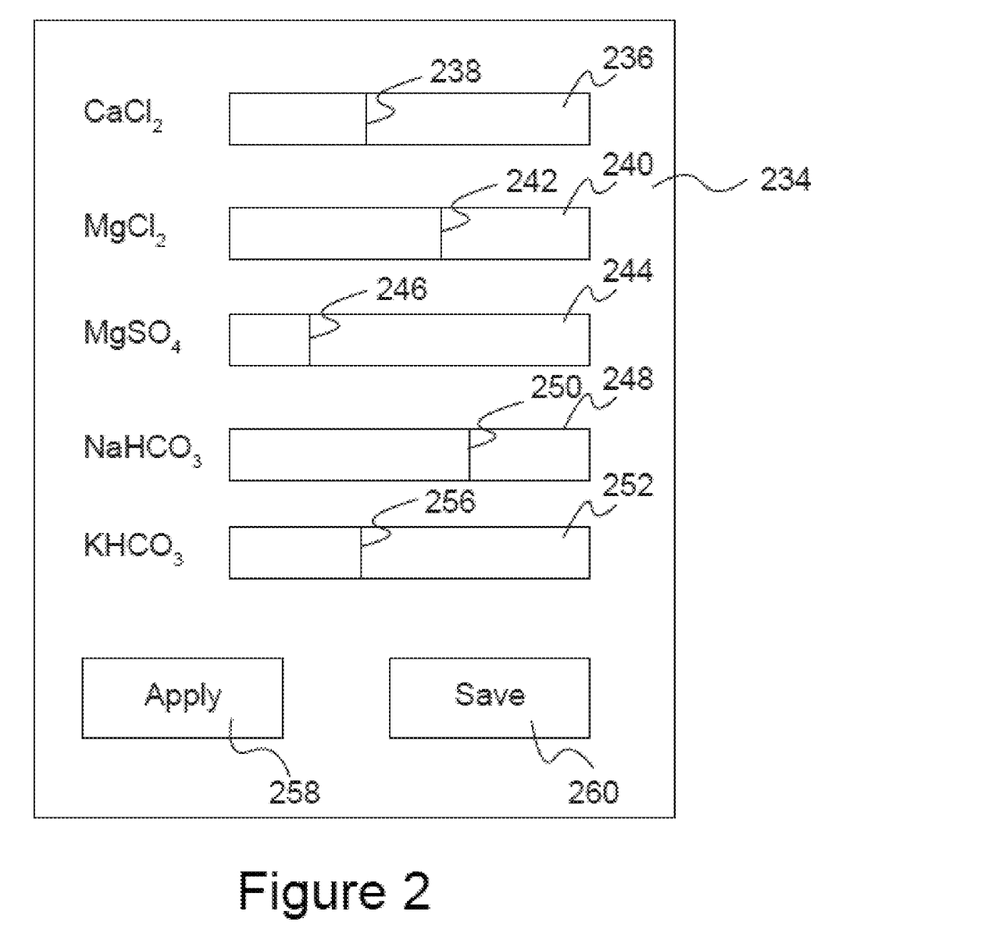
FIG. 2 shows a user interface for individualizing the mineralization of brewing water.

In the alternative, the user may save the water recipe by pressing the button 260.

The roasting user may also optimize the brewing water by selecting the button 230. In one embodiment, if the roasting user selects the button 230 and thereafter the selection buttons 228 for the coffee-type beverage, the controller 212 displays the set concentration adaption user interface 234 shown in FIG. 2. The roasting user may optimize the roasting water as described above with respect to the individualization of the brewing water.

If the user presses the button 230 twice, the controller 212 may display on the set ion concentration user interface 234 simply default values independent of a predetermined brewing water recipe the user may then adapt the set ion concentration of the minerals as described above by the controls 236, 240, 244, 248, 252 and the sliders 238, 242, 246, 250, 256.

If the user presses the button 232 the controller may ask the user to enter his user ID and thereafter the controller 212 can display on water recipes optimized for this user.

In the alternative, the coffee brewing apparatus 200 may recognize the user and display all water recipes optimized for this user by pressing the button 232.

The present invention provides an optimal brewing water for coffee having a total hardness higher than 15 ppm and lower than 90 ppm calcium carbonate and an alkalinity ranging from 20 ppm to 80 ppm calcium carbonate in order to prepare a good tasting coffee. Further, the brewing water has a pH between 6.0 and 7.5, preferably lower than 6.8. The pH lower than 6.8 prevents scaling in the brewing units.

Thereby, the taste experience of the user can be improved, and lifespan of the coffee brewing apparatus can be extended. Further, maintenance efforts can be reduced.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. Method of brewing coffee, comprising the following steps:
    requesting a user to select a coffee-based beverage on an input device coupled to a coffee brewing apparatus;
    selecting a suitable water recipe from a database comprising a plurality of water recipes suited for brewing coffee, wherein the selected water recipe is suited to the selected coffee-based beverage, wherein the water recipe defines a set mineral concentration of brewing water to be prepared;
    requesting a water preparation unit to prepare a brewing water based on the water recipe, wherein the water preparation unit is adapted to mineralize the brewing water according to the set mineral concentration of the water recipe;
    preparing brewing water based on the water recipe; and
    brewing the coffee-based beverage with the brewing water prepared according to the water recipe;
    wherein the step of preparing brewing water based on the water recipe includes the following steps:
        demineralizing the water drawn from a source to generate brewing water; and
        adding at least two minerals to the brewing water by adding minerals stored in at least two mineral reservoirs to the demineralized water under control of the controller,
        wherein each mineral reservoir stores a fluid solving at least two types of minerals and wherein each mineral reservoir is connected by a dosing device to a conduit in which the demineralized water flows.

2. Method according to claim 1, wherein the at least one type of mineral comprises at least one of the following:
    sodium bicarbonate;
    potassium bicarbonate;
    magnesium chloride;
    magnesium sulfate; and
    calcium chloride.

3. Method according to claim 1, wherein a set ion concentration of at least one of Ca ions and Mg ions and hydrogen carbonate ions of the selected water recipe corresponds to an ion concentration of the water used for brewing coffee during a process of adjusting a roasting method of the coffee.

4. Method according to claim 1, wherein the brewing water characterized by at least one of the following:
    a total hardness higher than 15 ppm and lower than 90 ppm $CaCO_3$;
    an alkalinity between 20 ppm and 80 ppm $CaCO_3$;
    the pH value ranges between 6.5 and 7.5; and
    the sodium and/or potassium concentration ranges from 10 to 150 ppm.

5. Method according to claim 1, wherein the coffee-based beverage includes at least one of:
    a coffee beverage type;
    a coffee bean type; and
    a coffee bean type roasted by a predetermined roasting parameter.

6. Method according to claim 1, the step of preparing the brewing water comprises the following steps:
    activating a user interface for adapting the set concentration of at least one mineral of the brewing water for generating a user defined water recipe comprising at least one user defined set concentration of the mineral; and
    preparing the brewing water based on the user defined water recipe comprising at least one user defined set concentration of the mineral.

7. Method according to claim 1, further comprising the following steps:
    brewing coffee with water prepared by a predetermined water recipe;
    measuring by a sensor at least one property of the coffee brewed by the predetermined water recipe; and
    determining an optimized water recipe based on the at least one measured property and the predetermined water recipe.

8. Method according to claim 7, wherein the following steps are executed at least once:
    brewing coffee with water prepared by the optimized water recipe;
    measuring at least one property of the coffee prepared by the optimized or a post-optimized water recipe by a sensor; and
    determining the post-optimized water recipe based on the at least one measured property and the predetermined water recipe.

9. Method according to claim 1, characterized by at least one of the following:
- a set ion concentration of at least one of Ca ions and Mg ions and hydrogen carbonate ions of the predetermined water recipe corresponds to an ion concentration of the water used for brewing coffee during a process of adjusting a roasting method of the coffee;
- a total hardness of the predetermined water recipe is higher than 15 ppm and lower than 90 ppm CaCO3;
- an alkalinity of the predetermined water recipe ranges between 20 ppm and 80 ppm CaCO3;
- the pH value of the predetermined water recipe ranges between 6.5 and 7.5; and
- the sodium and/or potassium concentration of the predetermined water recipe ranges from 10 to 150 ppm.

10. Method of adjusting roasting of coffee, comprising the following steps:
- demineralizing water;
- adding at least two minerals to the demineralized water for generating roasting water, wherein the roasting water is used for brewing coffee during the method of adjusting roasting of coffee;
- roasting coffee beans by at least one first roasting parameter;
- brewing coffee with the roasting water and the coffee roasted with the at least one first roasting parameter;
- determining at least one parameter of the brewed coffee; and
- adapting the at least one roasting parameter based on the coffee brewed with the roasting water and the coffee roasted with the at least one first roasting parameter.

11. Method according to claim 10, wherein the roasting water comprises:
- a total hardness of the predetermined water recipe is higher than 15 ppm and lower than 90 ppm CaCO3;
- an alkalinity of the predetermined water recipe ranges between 20 ppm and 80 ppm CaCO3;
- the pH value of the predetermined water recipe ranges between 6.5 and 7.5; and
- the sodium and/or potassium concentration of the predetermined water recipe ranges from 10 to 150 ppm.

12. A coffee brewing apparatus, comprising:
- a brewing element have a brewing water inlet, a coffee powder inlet and an outlet for outputting the brewed coffee;
- a user interface configured to receive a user input for selecting a coffee-based beverage;
- a filter configured for demineralizing water drawn from a source and configured for outputting;
- at least two mineral reservoirs, wherein each mineral reservoir stores a fluid solving at least one type of minerals;
- a dosing device, wherein each mineral reservoir is connected by a dosing device to a conduit in which the demineralized water flows; and
- a controller configured to:
  - receive from the user interface the coffee-based beverage selected by the user;
  - retrieve from a database a suitable water recipe that is suited to the selected coffee-based beverage, wherein the water recipe defines a set mineral concentration of water to be prepared; and
  - control the at least two dosing devices to prepare a brewing water based on the water recipe, wherein the dosing devices mineralize the water according to the water recipe for generating brewing water, wherein the prepared brewing water is fed into the brewing water inlet;
- wherein the coffee brewing apparatus further comprises a coffee outlet connected to the outlet of the brewing element for outputting the coffee-based beverage.

13. Method of brewing coffee, comprising the following steps:
- requesting a user to select a coffee-based beverage on an input device coupled to a coffee brewing apparatus;
- selecting a suitable water recipe from a database comprising a plurality of water recipes suited for brewing coffee, wherein the selected water recipe is suited to the selected coffee-based beverage, wherein the water recipe defines a set mineral concentration of brewing water to be prepared;
- requesting a water preparation unit to prepare a brewing water based on the water recipe, wherein the water preparation unit is adapted to mineralize the brewing water according to the set mineral concentration of the water recipe;
- preparing brewing water based on the water recipe;
- brewing the coffee-based beverage with the brewing water prepared according to the water recipe;
- measuring by a sensor at least one property of the coffee brewed by the predetermined water recipe; and
- determining an optimized water recipe based on the at least one measured property and the predetermined water recipe.

14. Method according to claim 13, wherein the step of preparing brewing water based on the water recipe includes the step of adding at least two minerals to the brewing water as defined by the water recipe.

15. Method according to claim 14, wherein the step of preparing brewing water based on the water recipe includes the step of filtering water drawn from a water source before the step of adding at least two minerals to the brewing water as defined by the water recipe.

16. Method according to claim 15, wherein:
- the step of filtering water drawn from a water source includes the step of demineralizing the water drawn from a source; and
- the step of adding at least two minerals to the brewing water includes the step of adding minerals stored in at least two mineral reservoirs to the demineralized water, wherein each mineral reservoir stores a fluid including at least one type of mineral and wherein each mineral reservoir is connected by a dosing device to a conduit in which the demineralized water flows.

17. Method according to claim 13, wherein the at least one type of mineral comprises at least one of the following:
- sodium bicarbonate;
- potassium bicarbonate;
- magnesium chloride;
- magnesium sulfate; and
- calcium chloride.

18. Method according to claim 13, wherein a set ion concentration of at least one of Ca ions and Mg ions and hydrogen carbonate ions of the selected water recipe corresponds to an ion concentration of the water used for brewing coffee during a process of adjusting a roasting method of the coffee.

19. Method according to claim 13, wherein the brewing water characterized by at least one of the following:
- a total hardness higher than 15 ppm and lower than 90 ppm CaCO3;
- an alkalinity between 20 ppm and 80 ppm CaCO3;

the pH value ranges between 6.5 and 7.5; and
the sodium and/or potassium concentration ranges from 10 to 150 ppm.

20. Method according to claim 13, wherein the coffee-based beverage includes at least one of:
a coffee beverage type;
a coffee bean type; and
a coffee bean type roasted by a predetermined roasting parameter.

* * * * *